(12) United States Patent
Ishidera

(10) Patent No.: US 7,620,982 B2
(45) Date of Patent: Nov. 17, 2009

(54) METHOD AND APPARATUS FOR COMPUTER LOCK MANAGEMENT, AND COMPUTER PRODUCT

(75) Inventor: Nobutaka Ishidera, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 871 days.

(21) Appl. No.: 10/923,033

(22) Filed: Aug. 23, 2004

(65) Prior Publication Data

US 2005/0229247 A1 Oct. 13, 2005

(30) Foreign Application Priority Data

Apr. 8, 2004 (JP) ............................. 2004-114401

(51) Int. Cl.
*G06F 7/04* (2006.01)

(52) U.S. Cl. ....................................... 726/17

(58) Field of Classification Search .................... 726/17
See application file for complete search history.

(56) References Cited

U.S. PATENT DOCUMENTS

| | | | | |
|---|---|---|---|---|
| 6,092,134 A * | 7/2000 | Chun et al. | ................ | 710/301 |
| 6,308,270 B1 * | 10/2001 | Guthery | ......................... | 726/9 |
| 6,480,097 B1 * | 11/2002 | Zinsky et al. | ................ | 340/5.8 |
| 6,590,597 B1 * | 7/2003 | Kim | ........................... | 715/866 |
| 6,912,663 B1 * | 6/2005 | Dayan et al. | ................. | 726/16 |
| 2003/0088780 A1 * | 5/2003 | Kuo et al. | ................... | 713/185 |

FOREIGN PATENT DOCUMENTS

| | | |
|---|---|---|
| JP | 2003-167641 | 6/2003 |
| JP | 2004-013220 | 1/2004 |
| WO | WO99/18546 | 4/1999 |
| WO | WO01/52212 | 7/2001 |

OTHER PUBLICATIONS

Japanese Office Action issued on Nov. 18, 2008 in corresponding Japanese Patent Application No. 2004-114401.
"PaSoRi(RC-S310) Application SFCard Viewer", Sony Corporation, http://www.sony.co.jp/Products/felica/pcrw/sfcard_ dl. html Mar. 25, 2004.

* cited by examiner

*Primary Examiner*—Kambiz Zand
*Assistant Examiner*—Amare Tabor
(74) *Attorney, Agent, or Firm*—Staas & Halsey LLP

(57) ABSTRACT

An occupancy state of access to a predetermined device when lock processing is to be executed is detected, and whether the lock processing is to be stopped is decided based on the result of the detection.

21 Claims, 8 Drawing Sheets

FIG.2

AUTHENTICATION DATA
11

| LOGON ID | LOGON DOMAIN | LOGON PASSWORD | PERSONAL IDENTIFICATION NUMBER |
|---|---|---|---|
| user1 | domain1 | f4g3nfl | 1451 |

METHOD AND APPARATUS FOR COMPUTER LOCK MANAGEMENT, AND COMPUTER PRODUCT

BACKGROUND OF THE INVENTION

1) Field of the Invention

The present invention relates to a method and an apparatus for computer lock management, and computer product that prevent a computer from becoming unable to recover from a lock state, and that allow a user to carry out lock processing for the computer safely.

2) Description of the Related Art

Conventionally, when a user of a computer is away from the desk, a locking mechanism known as workstation lock is used to prevent the computer from being used by other users illegally.

The workstation lock hides a work screen that is displayed when a user logs on to an operating system, and displays only a dialogue box to input a password or the like that is required for releasing the lock. Thus, the workstation lock restricts operations other than input in the dialogue box, and prevents illegal use by other users.

For example, in an operating system like Microsoft Windows (registered trademark), a module called a Graphical Identification and Authentication (GINA) executes the process for the workstation lock. This GINA module is of plug-in type, and by developing a security module conforming to specifications for the GINA and incorporating the security module in the operating system, the security module controls the GINA.

On the other hand, use of a storage device like a smart card or a Universal Serial Bus (USB) memory key on a computer has become popular. Thus, application software or the like, with which a user can confirm information stored in the smart card or the like on a personal computer, has been developed (see http://www.sony.co.jp/Products/felica/pcrw/sfcard_dl.html, Sony Corporation, "PaSoRi (RC-S310) Application SFCard Viewer", [online], [retrieved on Apr. 1, 2004]).

A security function is added to the storage device to use the storage device as an authentication device that performs user authentication, whereby illegal use of a computer is prevented.

For example, when a smart card is pulled out from a smart card reader, which reads information stored in the smart card, the workstation is automatically locked. The workstation lock cannot be released until the smart card is inserted again, and the authentication process is performed based on authentication information stored in the smart card.

However, the conventional technique disclosed on the Web page of Sony Corporation has a problem in that, if the storage device is pulled out in a state in which access to the storage device is occupied by a certain application program, even if the storage device is inserted again, the storage device is not recognized and the workstation lock cannot be released.

This is because a program for accessing the storage device does not cope with multiple access by plural application programs. Therefore, an error occurs if the storage device receives a request for access from a program other than the application program occupying access to the storage device.

When the workstation lock cannot be released, there is no way for releasing the workstation lock but to forcibly disconnect a power supply of a computer. Thus, it is likely that a document under preparation is destroyed, or data stored in the computer is damaged.

SUMMARY OF THE INVENTION

It is an object of the invention to at least solve the problems in the conventional technology.

A method of lock management according to an aspect of the present invention includes detecting an occupancy state of access to a predetermined device when a lock processing is to be executed, wherein lock management of the computer is performed using the predetermined device; and judging whether execution of the lock processing is to be stopped based on a result of the detecting.

A computer lock management apparatus according to another aspect of the present invention includes a detecting unit that detects an occupancy state of access to a predetermined device when a lock processing is to be executed, wherein lock management of the computer is performed using the predetermined device; and a judging unit that judges whether execution of the lock processing is to be stopped based on a result of the detecting by the detecting unit.

A computer-readable recording medium according to still another aspect of the present invention stores thereon the above computer program.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is an example of authentication data shown in FIG. 1;

DETAILED DESCRIPTION

Figure 1:
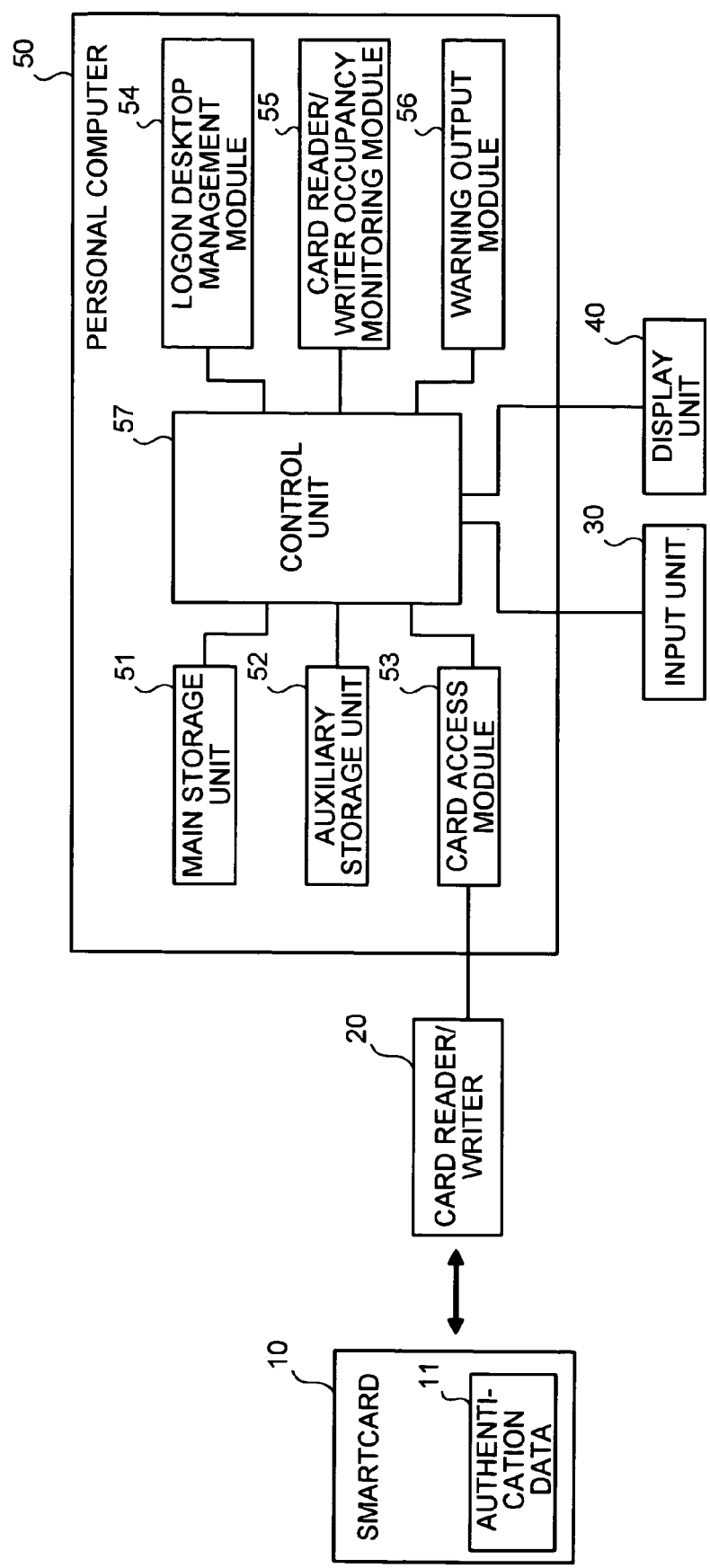
FIG. 1 is a functional block diagram of a personal computer according to an embodiment of the present invention.

Exemplary embodiments of a method and an apparatus for computer lock management, and a computer product according to the present invention will be hereinafter explained in detail with reference to the accompanying drawings. Note that, in the following explanation, the invention is applied to a personal computer that performs execution and release of workstation lock using a smart card.

First, a functional structure of a personal computer according to the embodiment will be explained with reference to FIG. 1.

The personal computer 50 is connected to a card reader/writer 20, an input unit 30, and a display unit 40. The card reader/writer 20 has an insertion portion into which a smart card 10 is inserted. When a user inserts the smart card 10, the card reader/writer 20 reads or writes data like authentication data 11 stored in the smart card 10. The input unit 30 is an input device like a keyboard or a mouse. The display unit 40 is a display.

FIG. 2 is an example of the authentication data 11 shown in FIG. 1. The authentication data 11 stores information like a logon ID, a logon domain, a logon password, and a personal identification number.

The user uses the logon ID, the logon domain, and the logon password to log on to the personal computer 50. The personal identification number is used for authenticating an owner of the smart card 10.

Referring to FIG. 1, the personal computer 50 is managed by an operating system (OS), and executes various application programs. In addition, on receiving a request for execution of workstation lock from a user, the personal computer 50 detects whether an application program other than a program for executing the workstation lock occupies access to the smart card 10 inserted in the card reader/writer 20.

The user pulls out the smart card 10 from the card reader/writer 20 or presses predetermined keys (e.g., presses a "CTRL" key, an "ALT" key, and a "DEL" key simultaneously) to thereby request the personal computer 50 to execute the workstation lock.

If the access to the smart card 10 is occupied, the personal computer 50 performs processing to stop the execution of the workstation lock. If the access to the smart card 10 is not occupied, the personal computer 50 executes the workstation lock.

Consequently, the personal computer 50 is prevented from shifting to a workstation lock state while the access to the smart card 10 is occupied by another application program. The personal computer 50 is prevented from becoming unable to recover from a lock state, and the user can carry out lock processing for the personal computer 50 safely.

The personal computer 50 includes a main storage unit 51, an auxiliary storage unit 52, a card access module 53, a logon desktop management module 54, a card reader/writer occupancy monitoring module 55, a warning output module 56, and a control unit 57.

The main storage unit 51 may be a random access memory (RAM), and temporarily stores various data. For example, when the main storage unit 51 receives a request for execution of the workstation lock, the main storage unit 51 stores information on an occupied state of access to the smart card 10 by an application program.

The auxiliary storage unit 52 is an auxiliary storage device like a hard disk device or an optical disk device, and stores various data related to the operating system and application software.

The card access module 53 requests the card reader/writer 20 to read or write data such as the authentication data 11 in the smart card 10.

In addition, the card access module 53 acquires information from the card reader/writer 20 on whether the smart card 10 is inserted in the card reader/writer 20. When the smart card 10 is pulled out from the card reader/writer 20, the card access module 53 requests the logon desktop management module 54 to execute the workstation lock.

The logon desktop management module 54 manages various kinds of desktop processing for a logon desktop. The logon desktop is a desktop area for displaying security information like a logon screen at the time of logon to the personal computer 50, and a screen for receiving input of authentication information like a password from a user.

In addition, the logon desktop management module 54 manages execution of the workstation lock process. More specifically, on receiving a request for execution of the workstation lock, the logon desktop management module 54 requests the card reader/writer occupancy monitoring module 55 to detect whether any application program other than a program executing the workstation lock occupies access to the smart card 10.

When the user pulls out the smart card 10 from the card reader/writer 20, the logon desktop management module 54 acquires information, which indicates that the smart card 10 is pulled out, from the card access module 53, receives a request for execution of the workstation lock, and requests the card reader/writer occupancy, module 55 to detect whether access to the smart card 10 is occupied.

If the access to the smart card 10 is occupied, the logon desktop management module 54 stops execution of the workstation lock. If the access to the smart card 10 is not occupied, the logon desktop management module 54 executes the workstation lock process.

Further, if the access to the smart card 10 is occupied by an application program, the logon desktop management module 54 requests the warning output module 56 to output a screen that urges the user to end that application program.

Moreover, when the user presses predetermined keys, the logon desktop management module 54 receives a request for execution of the workstation lock, and requests the card reader/writer occupancy monitoring module 55 to judge whether any application program other than a program executing the workstation lock occupies access to the smart card 10.

The card reader/writer occupancy monitoring module 55 judges whether an application program other than the program executing the workstation lock occupies the access to the smart card 10, and stores a result of the detecting in the main storage unit 51. The logon desktop management module 54 refers to this result to judge whether the workstation lock processing should be stopped.

If the card reader/writer occupancy monitoring module 55 judges that the access to the smart card 10 is occupied by an application program, the warning output module 56 displays information about an occupied state of access, on an application desktop. For example, the warning output module 56 displays a screen that urges the user to end the application program occupying the access.

The application desktop is a desktop area for application programs in which a user executes an application program and performs work like editing a document.

The control unit 57 controls the entire personal computer 50, and manages exchange of data among various functional units and modules.

Figure 3:
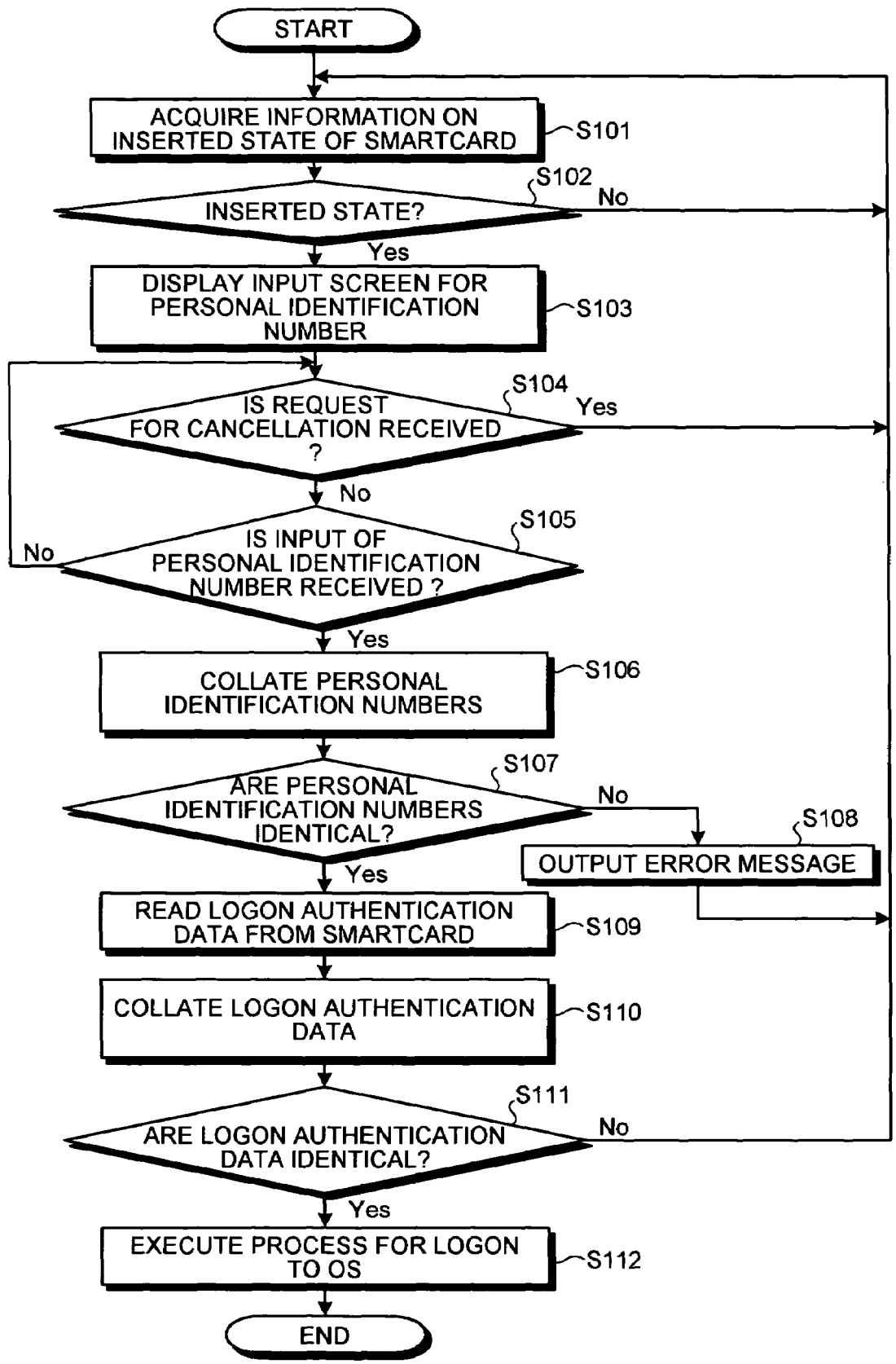
FIG. 3 is a flowchart of a process procedure for user authentication that is performed at the time of starting the personal computer or at the time of releasing a workstation lock.

FIG. 3 is a flowchart of the process procedure for user authentication processing that is performed at the time of starting the personal computer 50 or at the time of releasing the workstation lock.

When the personal computer 50 is started or when the workstation lock is released, the logon desktop management module 54 of the personal computer 50 acquires information on an inserted state of the smart card 10 from the card access module 53 (step S101).

Then, the logon desktop management module 54 checks whether the smart card 10 is in the inserted state (step S102). If the smart card 10 is not in the inserted state (No at step S102), the logon desktop management module 54 returns to step S101.

If the smart card 10 is in the inserted state (Yes at step S102), the logon desktop management module 54 displays an input screen for a personal identification number on the display unit 40 (step S103). Then, the logon desktop management module 54 checks whether a user has requested for cancellation of inputting the personal identification number (step S104). If the request for cancellation is received (Yes at step S104), the logon desktop management module 54 returns to step S101.

If the request for cancellation is not received (No at step S104), the logon desktop management module 54 checks whether an input of the personal identification number is received (step S105). Then, if the input of the personal identification number is not received (No at step S105), the logon desktop management module 54 returns to step S104.

If the input of the personal identification number is received (Yes at step S105), the logon desktop management module 54 collates the personal identification number, input of which is received, and the personal identification number stored in the authentication data 11 of the smart card 10 (step S106), and checks whether the personal identification numbers are identical (step S107).

If the personal identification numbers are not identical (No at step S107), the logon desktop management module 54 outputs an error message indicating that the personal identification numbers are different (step S108), returns to step S101, and repeats the subsequent steps.

If the personal identification numbers are identical (Yes at step S107), the logon desktop management module 54 reads logon authentication data like a logon ID, a logon domain, and a logon password of the user via the card access module 53 (step S109), and collates the logon authentication data read (step S110).

Then, the logon desktop management module 54 checks whether the logon authentication data read is identical with logon authentication data of the user registered in advance (step S111). If the logon authentication data read is not identical to the logon authentication data of the user registered in advance (No at step S111), the logon desktop management module 54 returns to step S101 and repeats the subsequent steps.

If the logon authentication data is identical to the logon authentication data of the user registered in advance (Yes at step S111), the logon desktop management module 54 executes processing for logon to an OS by the user (step S112), and ends the user authentication process.

Figure 4:
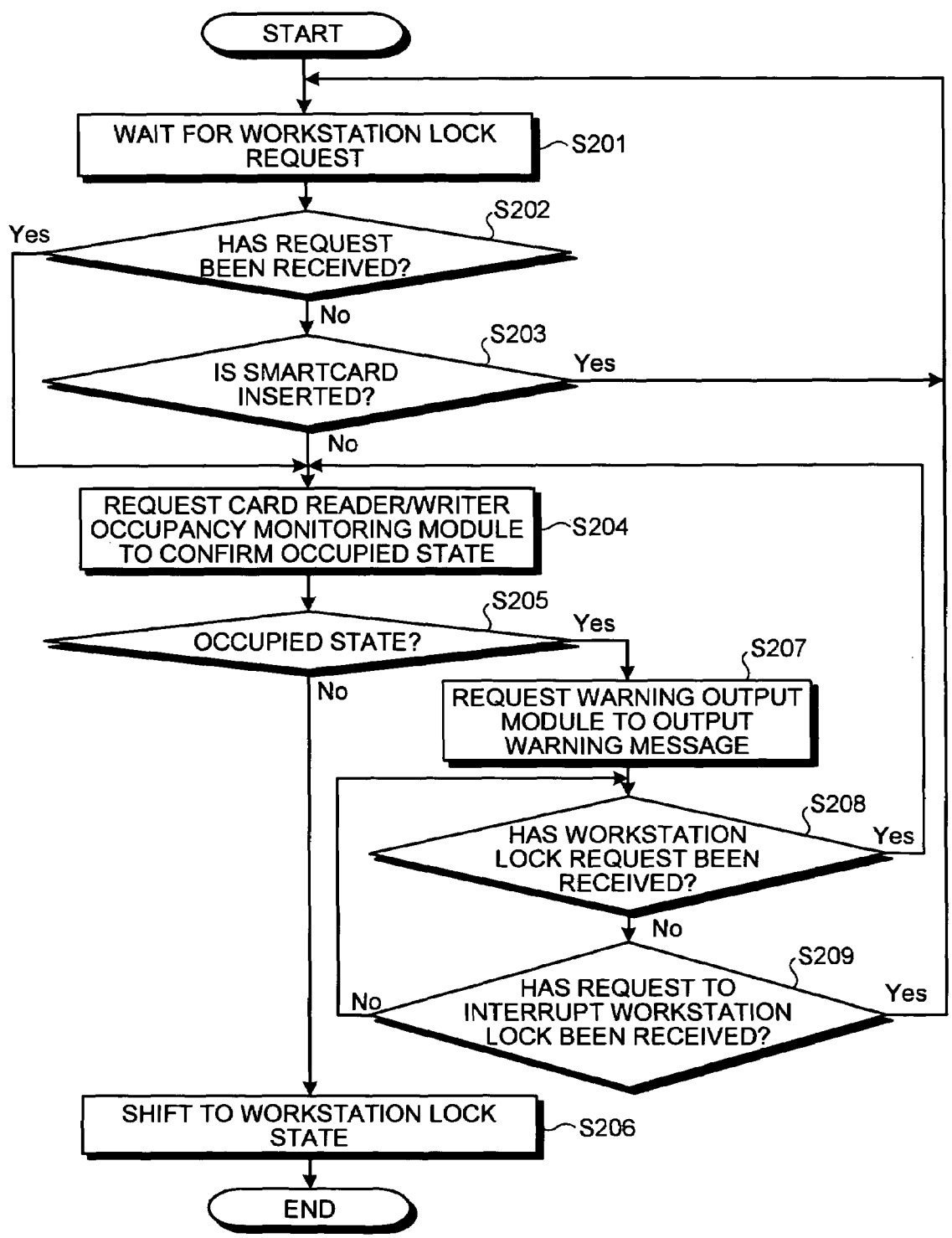
FIG. 4 is a flowchart of a process procedure for workstation lock management processing, performed by a logon desktop management module.

FIG. 4 is a flowchart of the process procedure for the workstation lock management processing, performed by the logon desktop management module 54.

First, the logon desktop management module 54 of the personal computer 50 waits for a workstation lock request (step S201). When user presses predetermined keys, the logon desktop management module 54 receives the request.

Then, the logon desktop management module 54 checks whether the request has been received (step S202). If the workstation lock request has not been received (No at step S202), the logon desktop management module 54 checks whether the smart card 10 is inserted in the card reader/writer 20 (step S203).

If the smart card 10 is inserted (Yes at step S203), the logon desktop management module 54 returns to step S201 and waits for the workstation lock request.

If the smart card 10 is not inserted (No at step S203), the logon desktop management module 54 requests the card reader/writer occupancy monitoring module 55 to confirm an occupied state of access to the smart card 10 by the application program (step S204). Confirmation process for the occupied state is explained in detail later, with reference to FIG. 5.

If the workstation lock request has been received (Yes at step S202), the logon desktop management module 54 proceeds to step S204, and requests the card reader/writer occupancy monitoring module 55 to confirm if the access to the smart card 10 is occupied by any application program.

After step S204, the logon desktop management module 54 acquires information on a result of the confirmation by the card reader/writer occupancy monitoring module 55, and checks whether the smart card 10 is in the occupied state (step S205).

Then, if the smart card 10 is not in the occupied state (No at step S205), the logon desktop management module 54 shifts to a workstation lock state (step S206), and ends the workstation lock management processing.

If the smart card 10 is in the occupied state (Yes at step S205), the logon desktop management module 54 requests the warning output module 56 to output a warning message that urges the user to end the application program occupying access to the smart card 10 (step S207).

After the user ends the application program that occupies access to the smart card 10, the warning output module 56 requests the logon desktop management module 54 to shift to the workstation lock. In addition, if the user requests interruption of the workstation lock, the warning output module 56 requests the logon desktop management module 54 to interrupt the workstation lock. Warning message output processing performed by the warning output module 56 is explained in detail later, with reference to FIG. 6.

Thereafter, the logon desktop management module 54 checks whether the request for shift to the workstation lock has been received from the warning output module 56 (step S208). If the request for shift has been received (Yes at step S208), the logon desktop management module 54 returns to step S204.

If the request for shift to the workstation lock has not been received (No at step S208), the logon desktop management module 54 checks whether a request to interrupt the workstation lock has been received from the warning output module 56 (step S209). If the request for interruption has been received (Yes at step S209), the logon desktop management module 54 returns to step S201, and repeats the subsequent steps.

If the request for interruption has not been received (No at step S209), the logon desktop management module 54 returns to step S208, and checks whether the workstation lock request has been received.

Figure 5:
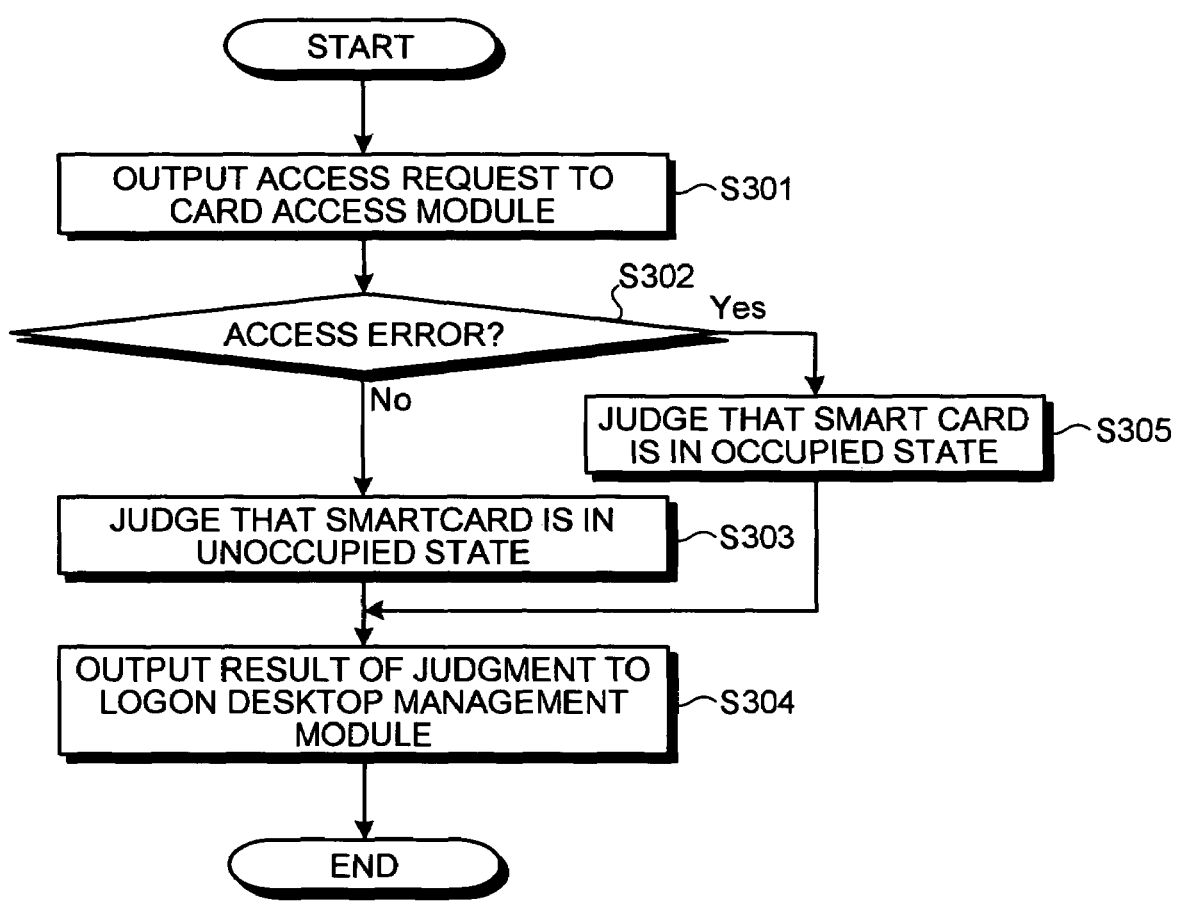
FIG. 5 is a flowchart of a process procedure for monitoring an occupancy state of a smart card, performed by a card reader/writer occupancy monitoring module.

FIG. 5 is a flowchart of the process procedure for monitoring an occupied state of the smart card 10, performed by the card reader/writer occupancy monitoring module 55.

First, when the logon desktop management module 54 requests the card reader/writer occupancy monitoring module 55 of the personal computer 50 to confirm an occupied state of the smart card 10 by an application program, the card reader/writer occupancy monitoring module 55 outputs a request to the card access module 53 for accessing the smart card 10. This brings the card access module 53 into a state in which the logon desktop management module 54 can access the card access module 53 (step S301).

Then, the card reader/writer occupancy monitoring module 55 checks whether an access error has occurred (step S302). If an access error does not occur (No at step S302), the card reader/writer occupancy monitoring module 55 judges that the smart card 10 is in an unoccupied state (step S303), outputs a result to the logon desktop management module 54 indicating that the smart card 10 is in the unoccupied state (step S304), and ends the occupied state monitoring process.

If an access error occurs (Yes at step S302), the card reader/writer occupancy monitoring module 55 judges that the smart card 10 is in the occupied state (step S305), outputs a result to the logon desktop management module 54 indicating that the smart card 10 is in the occupied state (step S304), and end the occupied state monitoring process.

Figure 6:
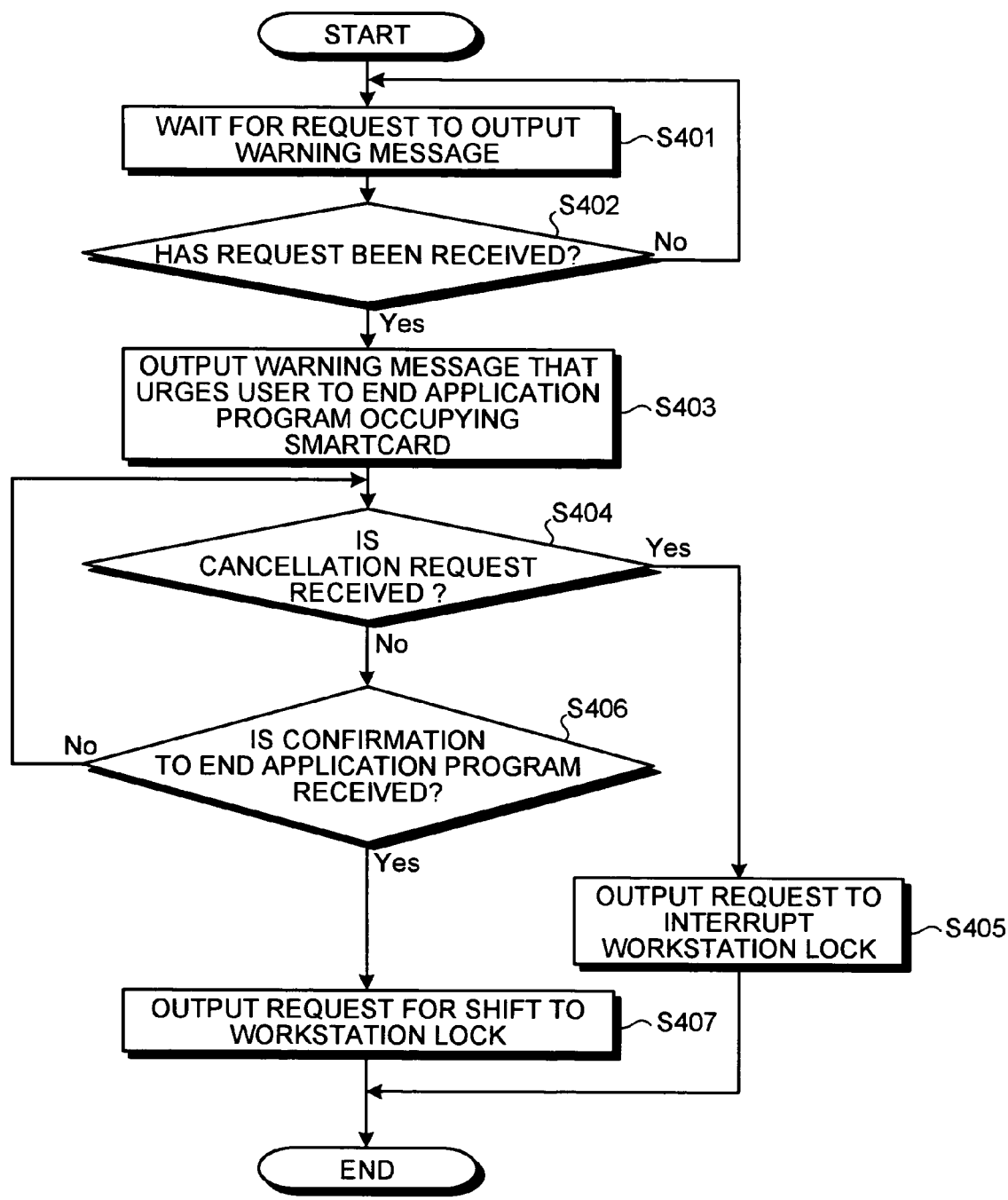
FIG. 6 is a flowchart of a process procedure for outputting a warning, performed by a warning output module.

FIG. 6 is a flowchart of the process procedure for outputting a warning, performed by the warning output module 56.

First, the warning output module 56 of the personal computer 50 waits for a request to output a warning message, issued by the logon desktop management module 54 (step S401). Then, the warning output module 56 checks whether the request to output the warning message has been received (step S402). If the request to output the warning message has not been received (No at step S402), the warning output module 56 returns to step S401.

If the request to output the warning message has been received (Yes at step S402), the warning output module 56 outputs a warning message that urges the user to end the application program occupying access to the smart card 10 (step S403).

Figure 7:
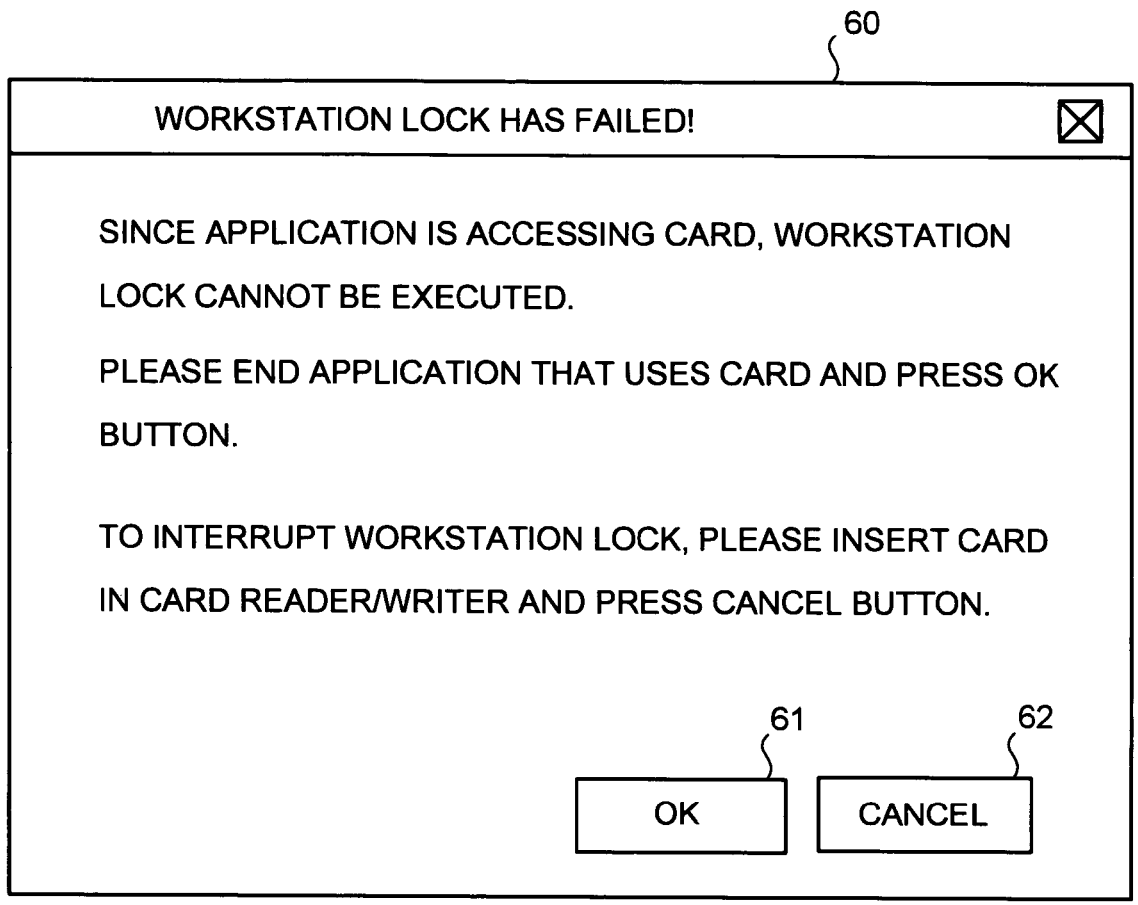
FIG. 7 is an example of a warning message output screen to display a warning message, that is outputted by the warning output module.

FIG. 7 is an example of a warning message output screen 60 that is outputted by the warning output module 56. The warning message output screen 60 displays a message indicating that the workstation lock cannot be executed because the application is accessing the smart card 10, a message requesting the user to end the application program, and a message indicating how the user can cancel the workstation lock.

On the warning message output screen 60, the user can click an OK button 61 to end the application program, and a cancel button 62 to cancel the workstation lock request.

If the user clicks the OK button 61 with a mouse or the like, the workstation lock process starts. If the user clicks the cancel button 62, the workstation lock process is canceled.

Returning to the explanation of FIG. 6, after step S403, the warning output module 56 checks whether the user requests for cancellation of the workstation lock (step S404). If the request for cancellation is received (Yes at step S404), the warning output module 56 outputs a request for interruption of the workstation lock to the logon desktop management module 54 (step S405), and ends the warning output process.

If the request for cancellation is not received (No at step S404), the warning output module 56 checks whether a confirmation to end the application program occupying access to the smart card 10 is received from the user (step S406). If the confirmation is not received (No at step S406), the warning output module 56 returns to step S404.

If the confirmation to end the application program is received (Yes at step S406), the warning output module 56 outputs a request for shift to workstation lock to the logon desktop management module 54 (step S407), and ends this warning output process.

In the above embodiment, the computer lock management function is realized on the personal computer 50. However, the computer lock management function may be realized by recording a program for realizing the computer lock management function in a computer readable recording medium, causing the personal computer 50 to read the program recorded in this recording medium, and executing the program.

Figure 8:
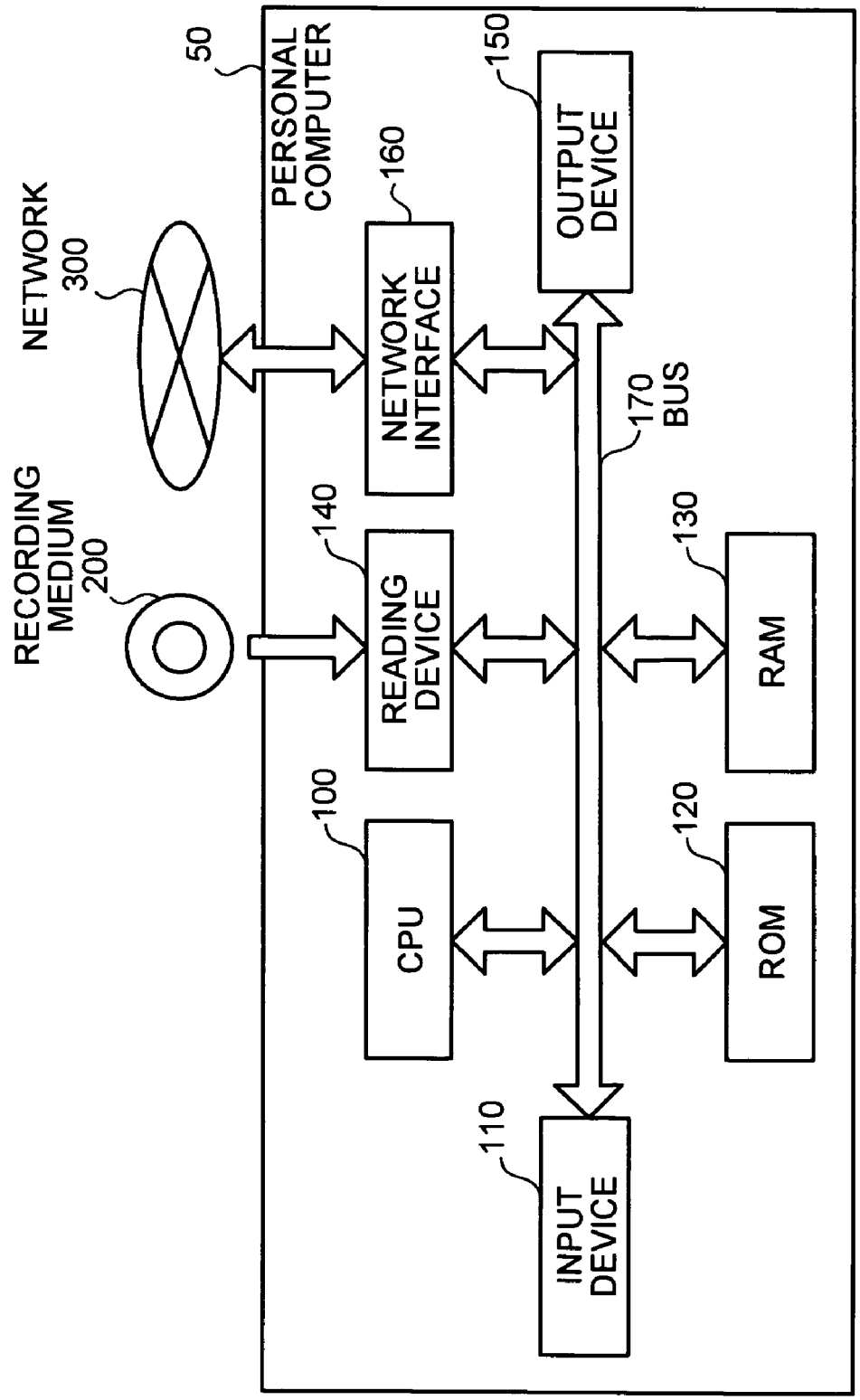
FIG. 8 is a block diagram of a hardware configuration of the personal computer that realizes a computer lock management function.

FIG. 8 is a block diagram of a hardware configuration of the personal computer 50 that realizes the computer block management function. The personal computer 50 has a structure in which a CPU 100 that executes the program, an input device 110 for inputting data, a ROM 120 having stored therein various data, a RAM 130 that stores calculation parameters and the like, a reading device 140 that reads the program for realizing the computer lock management function from a recording medium 200 having recorded therein the program, an output device 150 like a display, and a network interface 160 that exchanges data with other computers via a network 300 are connected by a bus 170.

After reading the program recorded in the recording medium 200 through the reading device 140, the CPU 100 executes the program, to thereby realize the computer lock management function. Note that examples of the recording medium 200 include an optical disk, a flexible disk, a CD-ROM, a hard disk, and the like. In addition, this program may be introduced into the personal computer 50 via the network 300.

As described above, according to the embodiment of the present invention, the personal computer 50 is prevented from becoming unable to recover from the work station lock state, and the user can carry out the workstation lock processing for the personal computer 50 safely.

Moreover, it is possible to urge the user to judge whether the workstation lock processing should be stopped.

Furthermore, the user can perform workstation lock processing to prevent an illegal operation by a third party safely.

Moreover, the personal computer 50 can recover from the workstation lock state based on the user authentication data 11.

Furthermore, an occupied state of access to the smart card 10 can be detected easily.

Moreover, in this embodiment, the computer management method is applied to a personal computer. However, the invention is not limited thereto, and can also be applied to computers like a workstation and various server apparatuses.

In the explanation of this embodiment, a personal computer performs the workstation lock. However, the invention is not limited thereto, and can also be applied to various lock methods for preventing illegal use of the personal computer.

In this embodiment, a logon desktop and an application desktop are present separately, and the logon desktop management module 54 and the warning output module 56 output information to display areas of the logon desktop and the application desktop, respectively. However, the invention is not limited thereto, and can also be applied when the logon desktop and the application desktop are united.

In this embodiment, execution and release of the workstation lock are performed by inserting and pulling out the smart card 10. However, the invention is not limited thereto, and a storage device like a USB key may be used instead of the smart card 10.

Among the pieces of processing explained in this embodiment, those explained as processing to be performed automatically can also be entirely or partially performed manually, or those explained as processing to be performed manually can also be entirely or partially performed automatically with a publicly known method. Besides, the processing procedures, the control procedures, the specific names, and the information including various data and parameters can be changed arbitrarily unless specifically noted otherwise.

The respective components of the illustrated apparatus are functionally conceptual, and are not always required to be constituted as shown in the figures. In other words, specific forms of distribution and integration of the apparatus are not limited to those shown in the figures, and the components of the apparatus can be entirely or partially distributed or integrated functionally or physically by an arbitrary unit based on various states of load and use.

The respective processing functions to be performed by the apparatus can be entirely or partially realized by a CPU, or a program that is analyzed and executed by the CPU, or can be realized as hardware according to a wired logic.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores thereon, a computer program that includes instructions which when executed on a computer cause the computer to execute:
   detecting an occupancy state of access to a predetermined device from a program other than a computer locking process when a lock processing is to be executed, wherein lock management of the computer is performed using the predetermined device, said predetermined device having a memory unit storing authentication information of a user including at least the user's logon ID; and
   determining whether to proceed with the lock processing based on the occupancy state detected, and
   wherein the detecting is performed on such occasions including when an access between an information reading device, which reads information stored in the predetermined device, and the predetermined device is cut off by removing the predetermined device from the information reading device, and when a request for execution of the lock processing is received from the user.

2. The computer-readable recording medium according to claim 1, further comprising outputting lock processing information, if it is determined at the determining that the lock processing does not proceed.

3. The computer-readable recording medium according to claim 2, wherein the lock processing information is information that urges a user to end a program that occupies access to the predetermined device.

4. The computer-readable recording medium according to claim 2, further comprising executing the lock processing, when the lock processing information is output and a program occupying access to the predetermined device ends.

5. The computer-readable recording medium according to claim 1, wherein the lock processing includes executing a workstation lock to restrict operation of the computer by a user.

6. The computer-readable recording medium according to claim 1, wherein the predetermined device is a storage device that stores user authentication information that is referred to by the computer to perform user authentication processing after the computer recovers from a lock state.

7. The computer-readable recording medium according to claim 1, wherein the detecting is performed based on a result of requesting access to the predetermined device.

8. A method of lock management, comprising:
   detecting an occupancy state of access to a predetermined device from a program other than a computer locking process when a lock processing is to be executed, wherein lock management of the computer is performed using the predetermined device, said predetermined device having a memory unit storing authentication information of a user including at least the user's logon ID; and
   determining whether to proceed with the lock processing based on the occupancy state detected, and
   wherein the detecting is performed on such occasions including when an access between an information reading device, which reads information stored in the predetermined device, and the predetermined device is cut off by removing the predetermined device from the information reading device, and when a request for execution of the lock processing is received from the user.

9. The method according to claim 8, further comprising outputting lock processing information, if it is determined at the determining that the lock processing does not proceed.

10. The method according to claim 9, wherein the lock processing information is information that urges a user to end a program that occupies access to the predetermined device.

11. The method according to claim 10, further comprising executing the lock processing, when the lock processing information is output and a program occupying access to the predetermined device ends.

12. The method according to claim 8, wherein the lock processing includes executing a workstation lock to restrict operation of the computer by a user.

13. The method according to claim 8, wherein the predetermined device is a storage device that stores user authentication information that is referred to by the computer to perform user authentication processing after the computer recovers from a lock state.

14. The method according to claim 8, wherein the detecting is performed based on a result of requesting access to the predetermined device.

15. A computer lock management apparatus comprising:
   a detecting unit that detects an occupancy state of access to a predetermined device from a program other than computer locking process when a lock processing is to be executed, wherein lock management of the computer is performed using the predetermined device, said predetermined device having a memory unit storing authentication information of a user including at least the user's logon ID; and
   a determining unit that determines whether to proceed with the lock processing based on the occupancy state detected by the detecting unit, and
   wherein the detecting unit performs the detection on such occasions including when an access between an information reading device, which reads information stored in the predetermined device, and the predetermined device is cut off by removing the predetermined device from the information reading device, and when a request for execution of the lock processing is received from the user.

16. The computer lock management apparatus according to claim 15, further comprising an outputting unit that outputs lock processing information, if the determining unit determines that the lock processing does not proceed.

17. The computer lock management apparatus according to claim 16, wherein the lock processing information urges a user to end a program that occupies access to the predetermined device.

18. The computer lock management apparatus according to claim 17, further comprising an executing unit that executes the lock processing, when the lock processing information is output and a program occupying access to the predetermined device ends.

19. The computer lock management apparatus according to claim 15, wherein the lock processing includes executing a workstation lock to restrict operation of the computer by a user.

20. The computer lock management apparatus according to claim 15, wherein the predetermined device is a storage device that stores user authentication information that is referred to by the computer to perform user authentication processing after the computer recovers from a lock state.

21. The computer lock management apparatus according to claim 15, wherein the detecting unit detects the occupancy state based on a result of requesting access to the predetermined device.

* * * * *